INVENTOR.
EDWARD T. VINCENT
BY
ATTORNEYS

INVENTOR.
EDWARD T. VINCENT
BY
ATTORNEYS

United States Patent Office 3,204,408
Patented Sept. 7, 1965

1

3,204,408
FUEL INJECTION MEANS
Edward T. Vincent, Ann Arbor, Mich., assignor to Continental Aviation and Engineering Corporation, Detroit, Mich., a corporation of Virginia
Filed Jan. 7, 1963, Ser. No. 249,936
12 Claims. (Cl. 60—39.74)

The present invention relates to multi-fuel internal combustion engines, particularly to a multi-fuel gas turbine engine having a through shaft and a surrounding annular combustion chamber and more particularly to a rotary fuel slinger construction for such an engine.

Gas turbine engines of the general construction contemplated for the rotary fuel slingers of the present invention have been heretofore disclosed in Szydlowski U.S. Patent No. 2,856,755. This reference, however, discloses fuel slingers which are constructed to deliver only liquid fuel to the combustor while the present invention provides rotary fuel slingers constructed to selectively deliver either gaseous or liquid fuel to the combustion chamber.

It is an object then of the present invention to improve gas turbine engines by providing a rotary fuel slinger adapted to deliver either a liquid or gaseous fuel to the combustor of such an engine.

It is yet another object of the present invention to simplify the construction of multi-fuel gas turbine engines by providing a single rotary fuel slinger for such an engine which can be used to deliver either a gaseous or a liquid fuel to the combustor of the engine.

It is still another object of the present invention to provide means for selectively delivering either a gaseous or liquid fuel to the combustor of a multi-fuel gas turbine engine by providing a rotary fuel slinger having a plurality of liquid discharge ports and a plurality of gaseous discharge ports spaced radially inwardly from said liquid discharge ports.

Other objects and advantages will readily occur to one skilled in the art to which the present invention pertains upon reference to the following drawings in which like characters refer to like parts throughout the several views and in which FIG. 1 is a longitudinal fragmentary cross sectional view of a gas turbine engine having a rotary fuel injection means embodying the present invention.

Figures 1, 2, 3:
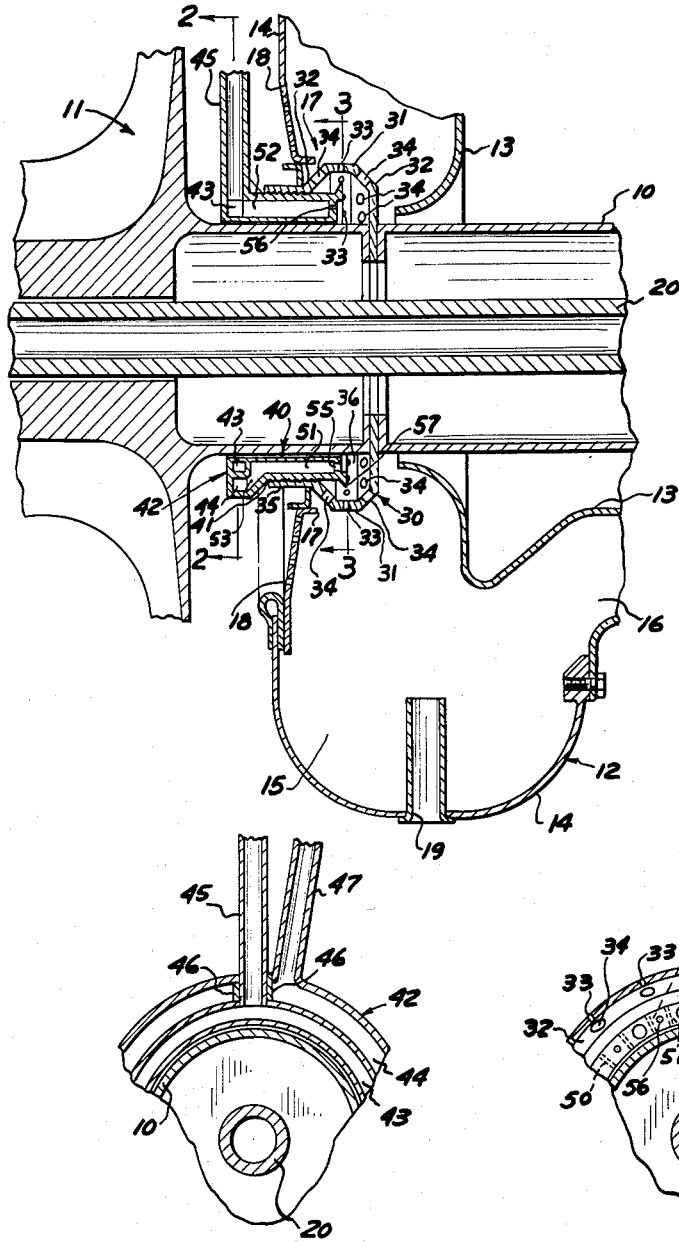
FIG. 2 is a fragmentary cross sectional view taken substantially on line 2—2 of FIG. 1.
FIG. 3 is a fragmentary cross sectional view taken substantially on line 3—3 of FIG. 1.

Now referring to FIGS. 1–3 of the drawings for a more detailed description of the present invention a portion of a multi-fuel internal combustion engine is illustrated as comprising a hollow power shaft 10 which drivingly connects an air impeller or centrifugal air compressor 11 with one or more turbines (not shown). A combustor 12 is preferably constructed of inner and outer walls of revolution respectively designated 13 and 14 forming a primary combustion chamber 15 and a secondary combustion chamber 16 axially spaced from the primary combustion chamber 15. The walls 13–14 are preferably constructed to form an annular inlet gap 17 and the outer wall 14 is provided with air inlet openings 18–19 opening respectively to the primary combustion chamber 15 and the secondary combustion chamber 16. The impeller 11 discharges compressed air through the openings 18–19 into the combustion chambers 15–16.

2

A separately rotating auxiliary shaft 20 is carried in the power shaft 10.

The fuel injector means of the present invention preferably comprises a fuel slinger device 30 secured by any suitable means to the power shaft 10 so that the device 30 rotates therewith. Preferably, the slinger device 30 comprises an annular channel structure having a base portion 31 and inclined side portions 32 which define an annular fuel passage 36. The base portion 31 is provided with a plurality of annularly spaced orifices 33 and the side portions are provided with a plurality of annularly spaced orifices 34 spaced radially inwardly from and each having a diameter greater than the diameters of the orifices 33. The fuel slinger device 30 is preferably provided with a projecting cylinder portion 35 radially spaced from the shaft 10.

An annular manifold member 40 is carried in a fixed position intermediate the cylinder portion 35 and the shaft 10. Labrynth seals 41 may be provided on the portion of the manifold member 40 engaging the cylinder portion 35. A header assembly 42 is carried by the manifold member 40 and as can best be seen in FIG. 2, preferably comprises a pair of annular concentric members 43–44. As can best be seen in FIG. 2, the member 44 is preferably of a greater cross sectional area than the member 43. A liquid fuel conduit 45 has a portion disposed intermediate sealed end sections 46 of the member 44 and communicates with the member 43. A gaseous fuel conduit 47 communicates with the member 44.

The manifold member 40 as can best be seen in FIG. 3 is provided with a plurality of radially extending wall portions 50 which divide the manifold member 40 into a plurality of alternate gaseous fuel chambers 51 and liquid fuel chambers 52. Passages 53 provide communication between the member 44 and the gaseous fuel chambers 51 and the member 43 is in open communication with the liquid fuel chambers 52. Orifices 55–56 are provided in the manifold member 40 to provide communication between the gaseous fuel chambers 51 and the fuel slinger 30 and the liquid fuel chambers 52 and the fuel slinger 30 respectively. A radially extending flange 57 is carried by the manifold member 40 in the passage 36 and in a position closely adjacent the orifices 55–56 to direct fuel toward the orifices 33–34 of the fuel slinger device 30.

In operation compressed air from the impeller 11 is directed into the primary and secondary combustion chambers 15–16 through the openings 18–19. If it is desired to operate the engine with liquid fuel, a metered charge is directed through the conduit 45 and into the member 43. The liquid fuel is then conducted from the member 43 into the liquid fuel chambers 52. From there the liquid fuel is emitted through the orifices 56 into the rotating fuel slinger device 30. Centrifugal force will cause the liquid fuel to be discharged radially outwardly through the orifices 33 and into the combustor 12. The flange 57 insures that the liquid fuel will be directed toward the orifices 33 rather than the larger orifices 34.

When it is desired to operate the engine on gaseous fuels a gaseous fuel will be emitted from the conduit 47 into the member 44 where it will expand into the chambers 51 and into the rotary fuel slinger device 30. The gaseous fuel will then be discharged radially outwardly through the orifices 33 and the larger orifices 34.

It is apparent that a rotary fuel slinger device 30 has been provided which can be used to supply either a liquid or gaseous fuel to the combustion chamber of an internal combustion engine. When a liquid fuel is used it will be discharged through the orifices 33. When a gaseous fuel is used and it is necessary to therefore supply a greater volume of fuel, the larger diameter orifices 34 will additionally deliver fuel to the combustion chamber.

Figure 4:
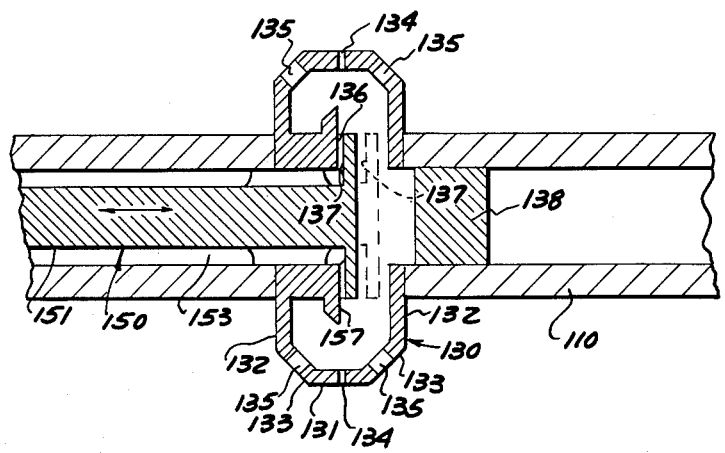
FIG. 4 is a diagrammatic view of another preferred fuel injection means of the present invention.

FIG. 4 illustrates another preferred embodiment of the present invention. A hollow power shaft 110 is shown diagrammatically as having a fuel slinger device 130 secured thereto for rotation therewith. A valve member 150 is axially slidably carried in the power shaft 110 and has a shaft portion 151 spaced from the inner walls of the power shaft to provide an annular fuel conduit chamber 153.

The fuel slinger device 130 preferably comprises an annular channel structure having a base portion 131, side walls 132 and inclined walls 133. The base portion 131 is provided with a plurality of relatively small diameter orifices 134 and the inclined walls 133 are provided with a plurality of relatively larger diameter orifices 135. The device 130 is provided with a radially extending face portion 136. The valve member 150 is provided with a valve face 137 disposed closely adjacent the face portion 136. A seal plug 138 is preferably provided in the shaft 110.

It is apparent that the structure shown in FIG. 4 operates as a metering device as well as a fuel slinger. When liquid fuel is used to operate the engine, the liquid fuel is directed through the chamber 153 past the valve face 137 and is directed by a radially extending flange 157 toward the orifices 134. The position of the valve member 150 is axially adjusted to meter the desired quantity of liquid fuel past the valve face 137. When a gaseous fuel is to be used the valve member 150 is adjusted toward the dotted line position shown so that the necessarily larger volume of gaseous fuel is permitted to pass the valve face 137 and be emitted through the orifices 135 as well as the orifices 134.

Figure 5:
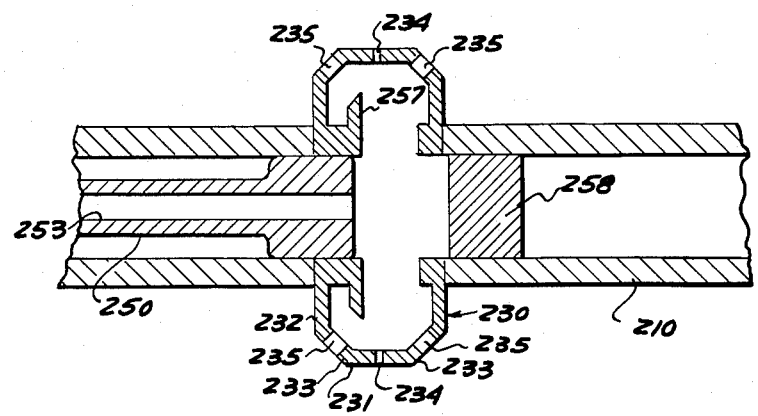
FIG. 5 is a diagrammatic view of yet another preferred fuel injection means of the present invention.

FIG. 5 illustrates yet another preferred embodiment of the present invention shown diagrammatically as comprising a hollow power shaft 210 having a fuel slinger device 230 secured thereto for rotation therewith. A seal plug 258 is preferably carried in the shaft 210. A member 250 is secured to the inner walls of the shaft 210 and is provided with an axial fuel passage 253.

The fuel slinger device 230 is substantially similar to the device described above and is provided with a base portion 231, side walls 232 and inclined walls 233. Small diameter orifices 234 are provided in the base portion 231 and larger diameter orifices 235 are provided in the inclined walls 233. A flange 257 is provided to direct liquid fuel toward the orifices 234. The fuel passage 253 is used to direct either liquid or gaseous fuel to the slinger 230 and thus must have a diameter sufficient to conduct the necessary quantity of the gaseous fuels.

It is apparent that in order to insure that liquid fuel will be discharged only through the smaller diameter orifices it is only necessary to limit the size of the orifices emitting liquid fuel to the manifold member. This can be accomplished by constructing the device so that the total cross sectional area of the discharge orifices closely approximates the total cross sectional area of the manifold orifices, and will have a flow capacity sufficient to pass the liquid fuel needed by the engine. The larger orifices provided in the slinger in total have a flow capacity sufficient to permit the larger volume of gaseous fuel needed by the engine to be discharged to the combustion chamber.

It is apparent that although I have described but several embodiments of the present invention other changes and modifications can be made without departing from the spirit of the invention or the scope of the appended claims.

I claim:

1. A fuel injection means for a multi-fuel internal combustion engine having a power shaft and a combustion chamber surrounding said shaft, said injection means comprising (a) a fuel slinger device secured to said shaft for rotation therewith and provided with a plurality of first orifices and a plurality of second orifices opening to said combustion chamber,
   (b) means operable to deliver either a liquid fuel or a gaseous fuel to said slinger device,
   (c) said first orifices being in total smaller in cross sectional area than said second orifices in total, and
   (d) means directing liquid fuel delivered by said fuel delivering means toward said first orifices and away from said second orifices.

2. The injection means as defined in claim 1 and in which said fuel delivering means comprises (a) a first member adapted for connection to a source of gaseous fuel,
   (b) a second member adapted for connection to a source of liquid fuel,
   (c) a manifold member communicating with said slinger device, and
   (d) said manifold member having a portion communicating with said first member and another portion communicating with said second member.

3. The injection means as defined in claim 2 and in which said first and second members are annular and concentrically disposed.

4. In an engine having a combustion chamber, fuel injection means delivering fuel to said combustion chamber, said means comprising (a) a rotating fuel slinger provided with an annular fuel passage,
   (b) means for conducting a gaseous fuel to said fuel passage,
   (c) means for conducting a liquid fuel to said fuel passage,
   (d) said fuel slinger being provided with a plurality of discharge portions in communication with said fuel passage,
   (e) a first plurality of said discharge ports being disposed in said slinger in the outer periphery thereof,
   (f) a second plurality of said discharge ports being disposed in said slinger radially inwardly of said first plurality of said discharge ports, and
   (g) said slinger being provided with means directing liquid fuel away from said second plurality of discharge ports and toward said first plurality of discharge ports whereby when liquid fuel is conducted to said fuel passage said liquid fuel enters said combustion chamber through said first plurality of discharge ports and when gaseous fuel is conducted to said fuel passage said gaseous fuel enters said combustion chamber through all of said discharge ports.

5. The fuel injection means as defined in claim 4 and in which said last mentioned means comprises an annular flange in said passage disposed in the path of liquid fuel flowing therein and operable to direct liquid fuel toward said first plurality of discharge ports and away from said second plurality of discharge ports.

6. The fuel injection means as defined in claim 4 and including metering means disposed intermediate said conducting means and said fuel passage.

7. The fuel injection means as defined in claim 4 and including means disposed in said passage and selectively operable to alter the total open cross section thereof to correspond approximately with the respective total cross sectional areas of said first plurality of discharge ports and said second plurality of discharge ports.

8. The fuel injection means as defined in claim 4 and in which (a) said gaseous fuel conducting means comprises a gaseous fuel passage open to said fuel slinger fuel passage,
   (b) said liquid fuel conducting means comprises a liquid fuel passage separate from said gaseous fuel passage and open to said fuel slinger passage, (c) the cross sectional area of said gaseous fuel passage exceeding the cross sectional area of said liquid fuel passage.

9. The fuel injection means as defined in claim 8 and in which the cross sectional area of said liquid fuel passage is substantially equal to the total cross sectional area of said first plurality of said discharge ports.

10. In an engine having a combustion chamber, fuel injection means delivering fuel to said combustion chamber, said means comprising (a) a rotating fuel slinger provided with an annular fuel passage,
(b) means for conducting a gaseous fuel to said fuel passage,
(c) means for conducting a liquid fuel to said fuel passage,
(d) said fuel slinger being provided with a plurality of discharge ports in communication with said fuel passage,
(e) a first plurality of said discharge ports being disposed in said slinger in the outer periphery thereof,
(f) a second plurality of said discharge ports comprising a plurality of annularly spaced openings displaced axially of said first plurality of discharge ports,
(g) said slinger being provided with means directing liquid fuel away from said second plurality of discharge ports and toward said first plurality of discharge ports whereby when liquid fuel is conducted to said fuel passage said liquid fuel enters said combustion chamber through said first plurality of discharge ports and when gaseous fuel is conducted to said fuel passage said gaseous fuel enters said combustion chamber through all of said discharge ports.

11. The fuel injection system as defined in claim 10 and in which said second plurality of discharge ports are radially inwardly spaced from said first plurality of discharge ports.

12. In an engine having a combustion chamber, fuel injection means delivering fuel to said combustion chamber, said means comprising (a) a rotating fuel slinger provided with an annular fuel passage,
(b) means for conducting a gaseous fuel to said fuel passage,
(c) means for conducting a liquid fuel to said fuel passage,
(d) said fuel slinger being provided with a plurality of discharge ports in communication with said fuel passage,
(e) a first plurality of said discharge ports being disposed in said slinger in the outer periphery thereof,
(f) a second plurality of said discharge ports being disposed in said slinger radially inwardly of said first plurality of discharge ports, and
(g) means disposed in said passage and operable to alter the total open cross-section thereof to correspond approximately with the respective total cross-sectional areas of said first plurality of discharge ports and said second plurality of discharge ports.

References Cited by the Examiner
UNITED STATES PATENTS

| | | | |
|---|---|---|---|
| 2,481,836 | 9/49 | Gibson | 158—11 |
| 2,720,750 | 10/55 | Schelp | 60—39.74 |
| 2,907,527 | 10/59 | Cummings | 60—39.74 |
| 3,000,435 | 9/61 | Bloom et al. | 158—11 |

SAMUEL LEVINE, *Primary Examiner.*